United States Patent
Hoogmartens

(10) Patent No.: US 8,991,991 B2
(45) Date of Patent: *Mar. 31, 2015

(54) FLEXIBLE, SCRATCH RESISTANT RADIATION CURABLE INKJET INKS

(75) Inventor: Ivan Hoogmartens, Wilrijk (BE)

(73) Assignee: Agfa Graphics NV, Mortsel (BE)

( * ) Notice: Subject to any disclaimer, the term of this patent is extended or adjusted under 35 U.S.C. 154(b) by 103 days.

This patent is subject to a terminal disclaimer.

(21) Appl. No.: 13/695,099

(22) PCT Filed: Jun. 8, 2011

(86) PCT No.: PCT/EP2011/059460
§ 371 (c)(1),
(2), (4) Date: Oct. 29, 2012

(87) PCT Pub. No.: WO2011/160954
PCT Pub. Date: Dec. 29, 2011

(65) Prior Publication Data
US 2013/0050367 A1    Feb. 28, 2013

Related U.S. Application Data

(60) Provisional application No. 61/360,507, filed on Jul. 1, 2010.

(30) Foreign Application Priority Data

Jun. 24, 2010 (EP) .................................. 10167114

(51) Int. Cl.
*B41J 2/01* (2006.01)
*C09D 11/32* (2014.01)
*B41J 2/21* (2006.01)
*C09D 11/101* (2014.01)

(52) U.S. Cl.
CPC .............. *C09D 11/32* (2013.01); *B41J 2/2107* (2013.01); *C09D 11/101* (2013.01)
USPC ............................... 347/100; 347/96; 347/102

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101; C09D 11/005; C09D 11/54; C09D 11/05; B41M 5/0011; B41M 5/0017; B41M 7/00
USPC ....................... 347/100, 95, 101, 96, 102, 21; 106/31.6, 31.13, 31.27; 523/160, 161
See application file for complete search history.

(56) References Cited

U.S. PATENT DOCUMENTS

| 6,310,115 B1 | 10/2001 | Vanmaele et al. |
| 2004/0021753 A1* | 2/2004 | Yoshihiro et al. ............. 347/100 |
| 2004/0024078 A1 | 2/2004 | Itoh et al. |
| 2007/0211111 A1 | 9/2007 | Hayata |
| 2008/0090929 A1* | 4/2008 | Wilson et al. .................. 522/75 |
| 2008/0108747 A1* | 5/2008 | Nakamura et al. ............. 524/606 |
| 2009/0087576 A1 | 4/2009 | Umebayashi |
| 2009/0124720 A1 | 5/2009 | Tsuchiya et al. |
| 2009/0202795 A1* | 8/2009 | Hayata et al. ............. 428/195.1 |

FOREIGN PATENT DOCUMENTS

| EP | 1 331 251 A1 | 7/2003 |
| EP | 1 900 784 A1 | 3/2008 |
| EP | 2 053 102 A1 | 4/2009 |
| EP | 2 088 176 A1 | 8/2009 |
| WO | 2008/048533 A2 | 4/2008 |

OTHER PUBLICATIONS

Official Communication issued in International Patent Application No. PCT/EP2011/059460, mailed on Aug. 26, 2011.
Hoogmartens, "Flexible, Scratch Resistant Radiation Curable Inkjet Inks,", U.S. Appl. No. 13/695,096, filed Oct. 29, 2012.

* cited by examiner

*Primary Examiner* — Manish S Shah
(74) *Attorney, Agent, or Firm* — Keating & Bennett, LLP

(57) ABSTRACT

A free radical radiation curable inkjet ink containing a photoinitiator and polymerizable compounds includes at least 45 wt % of a mixture of monomers consisting of: a) 10 to 35 wt % of one or more cyclic monofunctional acrylates wherein the homopolymer thereof has a $T_g$ larger than 20° C.; b) 10 to 30 wt % of a N-vinyl lactam and/or a vinylether acrylate; c) 10 to 30 wt % of an ethoxylated and/or propoxylated polyacrylate having a molecular weight of at least 450; wherein all wt % are based on the total weight of the inkjet ink; and wherein the $T_g$ is determined by the DSC method in ISO 11357-2: 1999.

17 Claims, 1 Drawing Sheet

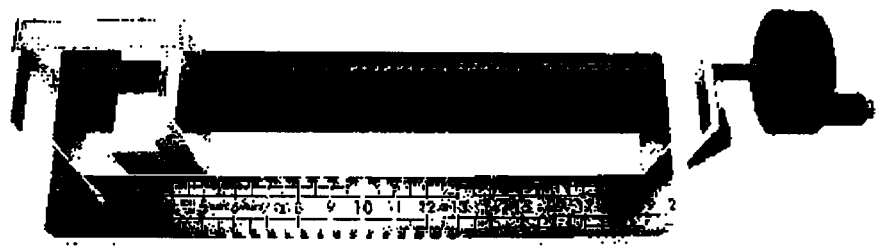

FLEXIBLE, SCRATCH RESISTANT RADIATION CURABLE INKJET INKS

CROSS-REFERENCE TO RELATED APPLICATIONS

This application is a 371 National Stage Application of PCT/EP2011/059460, filed Jun. 8, 2011. This application claims the benefit of U.S. Provisional Application No. 61/360,507, filed Jul. 1, 2010, which is incorporated by reference herein in its entirety. In addition, this application claims the benefit of European Application No. 10167114.7, filed Jun. 24, 2010, which is also incorporated by reference herein in its entirety.

BACKGROUND OF THE INVENTION

1. Field of the Invention

The present invention relates to radiation curable inkjet inks for producing cured images exhibiting high flexibility and scratch resistance.

2. Description of the Related Art

In inkjet printing, tiny drops of ink are projected directly onto an ink-receiver surface without physical contact between the printing device and the ink-receiver. The printing device stores the printing data electronically and controls a print head for ejecting the drops image-wise on an ink-receiver.

The composition of the inkjet ink is dependent on the inkjet printing method used and on the nature of the ink-receiver to be printed. UV-curable inks are more suitable for non-absorbent ink-receivers than e.g. water or solvent based inkjet inks. However the behaviour and interaction of UV-curable inkjet ink on substantially non-absorbing ink-receivers is quite complicated compared to water or solvent based inks on absorbent ink-receivers. In particular, the combination of good flexibility with good scratch resistance on a non-absorbent ink-receiver is problematic. Changes in the ink to improve the flexibility always reduce the scratch resistance and vice versa. In addition, other requirements such as good adhesion, good curing speed, controlled spreading of the ink on the ink receiver and low viscosity further limit the options for designing an inkjet ink exhibiting simultaneously good flexibility and good scratch resistance.

Increasing the ratio of polyfunctional monomers over monofunctional monomers in UV curable inks leads to improved curing speed. A high scratch resistance is obtained due to a highly cross-linked three-dimensional structure. However, the image of such an ink has a low flexibility and easily cracks on the recording medium or even peels off.

Decreasing the ratio of polyfunctional monomers over monofunctional monomers in UV curable inks leads to less crosslinked polymers, i.e. a higher flexibility, but lower curing speed and scratch resistance. The chemical nature of polyfunctional and monofunctional monomers also affects the adhesion quality and the viscosity of the inkjet ink.

In general, the approach to simultaneously enhance flexibility and scratch resistance is to use specific monomers and monomer combinations in the ink.

For example, US 2007071953 (FUJI) discloses an ink composition including a polymerization initiator; and at least one compound selected from the group consisting of (meth) acrylic acid and monofunctional (meth)acrylic acid esters and amides each having a carboxy group in a molecule. The presence of a carboxy group in the monomer provides a hydrogen-bonding interaction as shown in [0022] which is a weaker bond than the covalent bond made by polyfunctional monomers. The hydrogen-bonding bond can be broken thus allowing higher flexibility. Large amount of such acrylic acid monomers in the ink can however cause corrosion in inkjet print heads.

Another example is given by US 2004024078 (SEIREN) disclosing a UV curable ink including a coloring component, a reactive oligomer and/or a reactive prepolymer, a reactive diluent and a photoinitiator, wherein a polymer of the reactive oligomer and/or reactive prepolymer and a polymer of the reactive diluent have a glass transition point of 0° C. to 70° C. The cured film of such an ink exhibited good flexibility, scratch resistance and adhesion. However, according to [0021] the ink compositions have a rather high viscosity of 60 to 800 cps at 25° C., thus requiring high jetting temperatures of 60° or more.

US 2008108747 (FUJI) discloses ink composition including a polymerization initiator, a (meth)acrylate having a double bond with a carbon atom having an $sp^3$ hybrid orbital at an alpha position, and a colorant. Using the specific polymerizable compound in an ink composition leads to an enhanced image flexibility after curing, while maintaining high sensitivity and adhesion of the image to a recording medium.

US 2009087576 (FUJI) discloses at [0085] that from the viewpoint of flexibility and scratch resistance of a cured material being improved, a monofunctional cyclic (meth) acrylate is preferably included in the ink composition, more preferably one of the compounds M-1 to M-29 or phenoxyethyl acrylate are used.

US 2007211111 (FUJI) discloses an ink composition including an N-vinyl lactam, a radically polymerizable compound, and a polymerization initiator, the content of the N-vinyl lactam being at least 10 wt % of the ink total weight, and the content ratio by weight of N-vinyl lactam to the radically polymerizable compound being 1:8.5 to 1. The ink leads to cured images having excellent flexibility and adhesion to a substrate.

U.S. Pat. No. 6,310,115 (AGFA) discloses radiation curable inkjet inks containing radiation curable monomers containing vinylether and acrylate functions. The vinylether acrylates can achieve low viscosity, needed in ink jet printing, without introducing a significant amount of water or other solvent.

Despite all the suggested ink compositions, there still remains a need for radiation curable inkjet inks exhibiting good flexibility and scratch resistance, while maintaining low viscosity for jetting performance, a high cure speed and a good adhesion to a wide range of substrates.

SUMMARY OF THE INVENTION

In order to overcome the problems described above, preferred embodiments of the present invention provide inkjet inks including specific monofunctional and polyfunctional monomers in specific amounts.

Preferred embodiments of the invention have been realised with a free radical curable inkjet ink as defined below.

Preferred embodiments of the invention have also been realised with an inkjet printing method as defined below.

Further advantages and preferred embodiments of the present invention will become apparent from the following description.

BRIEF DESCRIPTION OF THE DRAWINGS

The FIGURE shows a custom built apparatus for stretching a radiation curable inkjet ink coated substrate.

DETAILED DESCRIPTION OF THE PREFERRED EMBODIMENTS

Definitions

The term "radiation curable ink" means that the ink is curable by UV radiation or by e-beam.

The term "substantially non-absorbing ink-jet ink-receiver" means any ink-jet ink-receiver which fulfils at least one of the following two criteria:

1) No penetration of ink into the ink-jet ink-receiver deeper than 2 μm;

2) No more than 20% of a droplet of 100 pL jetted onto the surface of the ink-jet ink-receiver disappears into the ink-jet ink-receiver in 5 seconds. If one or more coated layers are present, the dry thickness should be less than 5 μm. Standard analytical method can be used by one skilled in the art to determine whether an ink-receiver falls under either or both of the above criteria of a substantially non-absorbing ink-receiver. For example, after jetting ink on the ink-receiver surface, a slice of the ink-receiver can be taken and examined by transmission electron microscopy to determine if the penetration depth of the ink is greater than 2 μm. Further information regarding suitable analytical methods can be found in the article: DESIE, G, et al. Influence of Substrate Properties in Drop on Demand Printing. *Proceedings of Imaging Science and Technology's* 18*th International Conference on Non Impact Printing*. 2002, p. 360-365.

The term "alkyl" means all variants possible for each number of carbon atoms in the alkyl group i.e. for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethylpropyl and 2-methylbutyl etc.

The term "monofunctional monomer" means a monomer having only one polymerizable group, for example an acrylate group.

The term "polyfunctional monomer" means a monomer having two, three or more polymerizable groups, e.g. two acrylate groups and one vinyl ether group.

The term "polyacrylate" means a monomer having two, three or more acrylate groups.

Inkjet Inks

The radiation curable inkjet ink according to a preferred embodiment of the present invention contains a photoinitiator and polymerizable compounds including at least 45 wt % of a mixture of monomers consisting of:

a) 10 to 35 wt % of one or more cyclic monofunctional acrylates wherein the homopolymer thereof has a $T_g$ larger than 20° C.;

b) 10 to 30 wt % of a N-vinyl lactam and/or a vinylether acrylate;

c) 10 to 30 wt % of an ethoxylated and/or propoxylated polyacrylate having a molecular weight of at least 450;

wherein all wt % are based on the total weight of the inkjet ink.

In a preferred embodiment, the one or more cyclic monofunctional acrylates are present in the inkjet ink in amount between 15 wt % and 30 wt %.

In a preferred embodiment, the N-vinyl lactam and/or vinylether acrylate is present in the inkjet ink in amount between 15 wt % and 25 wt %.

In a preferred embodiment, the ethoxylated and/or propoxylated multifunctional acrylate is present in the inkjet ink in amount between 15 wt % and 25 wt %.

The inkjet ink includes preferably at least one colour pigment, but can however also be a colourless liquid. Such a colourless inkjet ink can, for example, be used to enhance the glossiness of an inkjet printed image.

The radiation curable inks are preferably non-aqueous inks. The term "non-aqueous" refers to a liquid carrier which should contain no water. However sometimes a small amount, generally less than 5 wt % of water based on the total weight of the composition or ink, can be present. This water was not intentionally added but came into the composition via other components as a contamination, such as for example polar organic solvents. Higher amounts of water than 5 wt % tend to make the non-aqueous liquids and inks instable, preferably the water content is less than 1 wt % based on the total weight of radiation curable composition or ink and most preferably no water at all is present.

The radiation curable inks preferably do not contain an evaporable component such as an organic solvent. But sometimes it can be advantageous to incorporate a small amount of an organic solvent to improve adhesion to the surface of a substrate after UV-curing. In this case, the added solvent can be any amount in the range that does not cause problems of solvent resistance and VOC, and preferably 0.1-10.0 wt %, and particularly preferably 0.1-5.0 wt %, each based on the total weight of the curable ink.

The inkjet ink most preferably includes no organic solvent or water.

A free radical radiation curable inkjet ink set includes at least two different inkjet inks according to a preferred embodiment of the present invention, wherein at least one inkjet ink contains one or more colorants, preferably one or more color pigments.

The curable ink set preferably comprises at least one yellow curable ink (Y), at least one cyan curable ink (C) and at least one magenta curable ink (M) and preferably also at least one black curable ink (K). The curable CMYK-ink set may also be extended with extra inks such as red, green, blue, and/or orange to further enlarge the color gamut of the image. The CMYK-ink set may also be extended by the combination of the full density inkjet inks with light density inkjet inks. The combination of dark and light color inks and/or black and grey inks improves the image quality by a lowered graininess.

The pigmented radiation curable ink preferably contains a dispersant, more preferably a polymeric dispersant, for dispersing the pigment. The pigmented curable ink may contain a dispersion synergist to improve the dispersion quality and stability of the ink. Preferably, at least the magenta ink contains a dispersion synergist. A mixture of dispersion synergists may be used to further improve dispersion stability.

The viscosity of the radiation curable inkjet ink is preferably smaller than 20 mPa·s at 45° C. and at a shear rate of 1,000 $s^{-1}$, more preferably between 2 and 15 mPa·s at 45° C. and at a shear rate of 1,000 $s^{-1}$. The viscosity of an inkjet ink measured at 45° C. with the "Robotic Viscometer Type VIS-CObot" from CAMBRIDGE APPLIED SYSTEMS corresponds to the viscosity measured at 45° C. and at a shear rate of 1,000 $s^{-1}$.

The surface tension of the curable inkjet ink is preferably in the range of about 20 mN/m to about 70 mN/m at 25° C., more preferably in the range of about 22 mN/m to about 40 mN/m at 25° C.

The curable inkjet ink may further also contain at least one inhibitor for improving the thermal stability of the ink.

The curable inkjet ink may further also contain at least one surfactant for obtaining good spreading characteristics on a substrate.

Polymerizable Compounds

The radiation curable inkjet ink according to a preferred embodiment of the present invention contains preferably polymerizable compounds in an amount higher than 80 wt %, more preferably in an amount higher than 85 wt % based on the total weight of the inkjet ink.

The monomers and oligomers used in radiation curable pigment dispersions and inks, especially for food packaging applications, are preferably purified compounds having no or almost no impurities, more particularly no toxic or carcinogenic impurities. The impurities are usually derivative compounds obtained during synthesis of the polymerizable compound. Sometimes, however, some compounds may be added deliberately to pure polymerizable compounds in harmless amounts, for example, polymerization inhibitors or stabilizers.

Cyclic Monofunctional Acrylates

The polymerizable compounds include at least 10 to 35 wt % of one or more cyclic monofunctional acrylates wherein the homopolymer thereof has a glass transition temperature $T_g$ larger than 20° C., based on the total weight of the inkjet ink.

The glass transition temperature (Tg) marks the onset of segmental mobility for a polymer. The temperature below which the polymer segments do not have sufficient energy to move past one another is the glass transition temperature. Below the glass transition temperature, materials are a glass. Below the Tg, if the material is stressed, the only reversible response can be for bond angles and distances to be strained, since no gross movements of segments can take place. If the temperature is above the glass transition temperature the segments rearrange to relieve an externally applied stress which results in heat flow.

Preferred cyclic monofunctional acrylates include those of the compounds M-1 to M-29 disclosed by US 2009087576 (FUJI) at [0085] which have a glass transition temperature $T_g$ larger than 20° C. Most monomers do not fall within a range of 15° C. to 25° C. and one can simply rely on the $T_g$ mentioned in the manufacturers' datasheet for that monomer. However, when in doubt if the Tg of a certain monomer is below or above 20° C., the method for determining the $T_g$ to be taken is the DSC method in ISO 11357-2:1999.

In a preferred embodiment of the inkjet ink according to the present invention, the one or more cyclic monofunctional acrylates are selected from the group consisting of 4-tert.butylcyclohexylacrylate and isobornyl acrylate.

In a preferred embodiment of the inkjet ink according to the present invention, the one or more cyclic monofunctional acrylates include an alicyclic monomer.

In a preferred embodiment of the inkjet ink according to the present invention, the one or more cyclic monofunctional acrylates include an aromatic monomer.

In a preferred embodiment of the inkjet ink according to the present invention, the one or more cyclic monofunctional acrylates include a heterocyclic monomer or a heteroaromatic monomer. A heteroaromatic monomer is a monomer wherein at least one of the cyclic conjugated carbon atoms is replaced by a sulfur atom, an oxygen atom, a selenium atom, a nitrogen atom or a phosphorous atom.

N-Vinyl Lactams and Vinylether Acrylates

The polymerizable compounds including at least 10 to 30 wt % of a N-vinyl lactam and/or a vinylether acrylate, based on the total weight of the inkjet ink.

In a preferred embodiment of the inkjet ink according to the present invention, the N-vinyl lactam is N-vinyl caprolactam.

The vinylether acrylate is preferably represented by Formula (I):

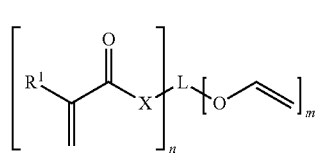

Formula (I)

wherein, $R^1$ represents hydrogen, or a substituted or unsubstituted alkyl group, L represents a linking group comprising at least one carbon atom, X represents O, S or $NR^2$ wherein $R^2$ has the same meaning as $R^1$;

when $X=NR^2$, L and $R^2$ may form together a ring system, and n and m independently represent a value from 1 to 5.

In a preferred embodiment, the compound according to Formula (I) has $R^1$ representing hydrogen, X representing O, and n representing a value of 1. The value of m is preferably 1, 2 or 3. L preferably comprises 2, 3 or 4 carbon atoms.

Preferred vinylether acrylates are those disclosed in U.S. Pat. No. 6,310,115 (AGFA), incorporated herein by reference. Other suitable vinylether (meth)acrylates are those disclosed in columns 3 and of U.S. Pat. No. 6,767,980 (NIPPON SHOKUBAI), incorporated herein by specific reference.

A single compound or a mixture of vinylether acrylates may be used.

In a preferred embodiment of the inkjet ink according to the present invention, the vinylether acrylate is 2-(vinyloxyethoxy)ethyl acrylate.

Ethoxylated and Propoxylated Polyacrylates

The ethoxylated and/or propoxylated polyacrylate have a molecular weight of at least 450, preferably a molecular weight of at least 550, more preferably a molecular weight of at least 650 and most preferably a molecular weight of at least 900.

In a preferred embodiment of the inkjet ink according to the present invention, the ethoxylated and/or propoxylated polyacrylate includes from 6 to 20 ethoxy units and/or propoxy units, more preferably from 9 to 15 ethoxy units and/or propoxy units.

The ethoxylated and/or propoxylated polyacrylate has at least two acrylate groups, preferably at least three, four, five or six acrylate groups.

A preferred ethoxylated and/or propoxylated polyacrylate is an ethoxylated and/or propoxylated trimethylolpropane triacrylate. Commercial examples include SARTOMER™ SR499, SARTOMER™ SR502, SARTOMER™ SR9035 and SARTOMER™ SR415 from SARTOMER.

A suitable propoxylated polyacrylate is propoxylated glyceryl triacrylate. A commercial example is SARTOMER™ SR9021 from SARTOMER.

Ethoxylated and/or propoxylated polyacrylate having two acrylate groups include polyethyleneglycol diacrylate. Commercial examples include SARTOMER™ SR415 and SARTOMER™ SR415 from SARTOMER.

Other Monomers and Oligomers

The polymerizable compounds include at least 45 wt % of a mixture of the above specific monomers, but may include other monomers and oligomers.

There are no real limitations on the nature of these other monomers and oligomers, however monomers and oligomers having a too high molecular weight may be unsuitable for preparing inkjet inks with the desired low viscosity.

A combination of monomers, oligomers and/or prepolymers may also be used. The monomers, oligomers and/or prepolymers may possess different degrees of functionality, and a mixture including combinations of mono-, di-, tri- and higher functionality monomers, oligomers and/or prepolymers may be used.

Particularly preferred monomers and oligomers are those other monomers and oligomers listed in [0106] to [0114] of EP 1911814 A (AGFA GRAPHICS) incorporated herein as a specific reference.

A particularly preferred monomer is a urethane acrylate, such as GENOMER™ 1122 from RAHN, as it was observed that this monomer is capable of increasing the viscosity of the inkjet ink without adversely affecting flexibility and adhesion.

Photoinitiators and Co-Initiators

The photoinitiator is a free radical initiator. A free radical photoinitiator is a chemical compound that initiates polymerization of monomers and oligomers when exposed to actinic radiation by the formation of a free radical.

Two types of free radical photoinitiators can be distinguished and used in the inkjet ink of a preferred embodiment of the present invention. A Norrish Type I initiator is an initiator which cleaves after excitation, yielding the initiating radical immediately. A Norrish type II-initiator is a photoinitiator which is activated by actinic radiation and forms free radicals by hydrogen abstraction from a second compound that becomes the actual initiating free radical. This second compound is called a polymerization synergist or co-initiator. Both type I and type II photoinitiators can be used in a preferred embodiment of the present invention, alone or in combination.

Suitable photo-initiators are disclosed in CRIVELLO, J. V., et al. VOLUME III: Photoinitiators for Free Radical Cationic. 2nd edition. Edited by BRADLEY, G. London, UK: John Wiley and Sons Ltd, 1998. p. 287-294.

Specific examples of photo-initiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis (2,6-dimethylbenzoyl)-2,4,4-trimethylpentylphosphine oxide, 2,4,6trimethyl-benzoyldiphenylphosphine oxide, 2-methyl-1-[4-(methylthio) phenyl]-2-morpholinopropan-1-one, 2,2-dimethoxy-1,2-diphenylethan-1-one or 5,7-diiodo-3-butoxy-6-fluorone.

Suitable commercial photo-initiators include IRGACURE™ 184, IRGACURE™ 500, IRGACURE™ 907, IRGACURE™ 369, IRGACURE™ 1700, IRGACURE™ 651, IRGACURE™ 819, IRGACURE™ 1000, IRGACURE™ 1300, IRGACURE™ 1870, DAROCUR™ 1173, DAROCUR™ 2959, DAROCUR™ 4265 and DAROCUR™ ITX available from CIBA SPECIALTY CHEMICALS, LUCERIN™ TPO available from BASF AG, ESACURE™ KT046, ESACURE™ KIP150, ESACURE™ KT37 and ESACURE™ EDB available from LAMBERTI, H-NU™ 470 and H-NU™ 470X available from SPECTRA GROUP Ltd.

For safety reasons, in particular for food packaging applications, the photoinitiator is preferably a so-called diffusion hindered photoinitiator. A diffusion hindered photoinitiator is a photoinitiator which exhibits a much lower mobility in a cured layer of the curable liquid or ink than a monofunctional photoinitiator, such as benzophenone. Several methods can be used to lower the mobility of the photoinitiator. One way is to increase the molecular weight of the photoinitiator so that the diffusion speed is reduced, e.g. polymeric photoinitiators. Another way is to increase its reactivity so that it is built into the polymerizing network, e.g. multifunctional photoinitiators (having 2, 3 or more photoinitiating groups) and polymerizable photoinitiators. The diffusion hindered photoinitiator is preferably selected from the group consisting of non-polymeric multifunctional photoinitiators, oligomeric or polymeric photoinitiators and polymerizable photoinitiators. Non-polymeric di- or multifunctional photoinitiators are considered to have a molecular weight between 300 and 900 Dalton. Non-polymerizable monofunctional photoinitiators with a molecular weight in that range are not diffusion hindered photoinitiators. Most preferably the diffusion hindered photoinitiator is a polymerizable initiator.

A suitable diffusion hindered photoinitiator may contain one or more photoinitiating functional groups derived from a Norrish type I-photoinitiator selected from the group consisting of benzoinethers, benzil ketals, α,α-dialkoxyacetophenones, α-hydroxyalkylphenones, α-aminoalkylphenones, acylphosphine oxides, acylphosphine sulfides, α-haloketones, α-halosulfones and phenylglyoxalates.

A suitable diffusion hindered photoinitiator may contain one or more photoinitiating functional groups derived from a Norrish type II-initiator selected from the group consisting of benzophenones, thioxanthones, 1,2-diketones and anthraquinones.

Suitable diffusion hindered photoinitiators are also those disclosed in EP 2053101 A (AGFA GRAPHICS) in paragraphs [0074] and [0075] for difunctional and multifunctional photoinitiators, in paragraphs [0077] to [0080] for polymeric photoinitiators and in paragraphs [0081] to [0083] for polymerizable photoinitiators.

Other preferred polymerizable photoinitiators are those disclosed in EP 2065362 A (AGFA) and EP 2161264 A (AGFA), incorporated herein by reference.

A preferred amount of photoinitiator is 0-50 wt %, more preferably 0.1-20 wt %, and most preferably 0.3-15 wt % of the total weight of the curable pigment dispersion or ink.

In order to increase the photosensitivity further, the radiation curable ink may additionally contain co-initiators. Suitable examples of co-initiators can be categorized in three groups:

(1) tertiary aliphatic amines such as methyldiethanolamine, dimethylethanolamine, triethanolamine, triethylamine and N-methylmorpholine;

(2) aromatic amines such as amylparadimethylaminobenzoate, 2-n-butoxyethyl-4-(dimethylamino) benzoate, 2-(dimethylamino)ethylbenzoate, ethyl-4-(dimethylamino)benzoate, and 2-ethylhexyl-4-(dimethylamino)benzoate; and (3) (meth)acrylated amines such as dialkylamino alkyl (meth)acrylates (e.g., diethylaminoethylacrylate) or N-morpholinoalkyl-(meth)acrylates (e.g., N-morpholinoethylacrylate).

The preferred co-initiators are aminobenzoates.

When one or more co-initiators are included into the radiation curable ink, preferably these co-initiators are diffusion hindered for safety reasons, in particular for food packaging applications.

A diffusion hindered co-initiator is preferably selected from the group consisting of non-polymeric di- or multifunctional co-initiators, oligomeric or polymeric co-initiators and polymerizable co-initiators. More preferably the diffusion hindered co-initiator is selected from the group consisting of polymeric co-initiators and polymerizable co-initiators. Most preferably the diffusion hindered co-initiator is a polymerizable co-initiator having at least one (meth)acrylate group, more preferably having at least one acrylate group.

Preferred diffusion hindered co-initiators are the polymerizable co-initiators disclosed in EP 2053101 A (AGFA GRAPHICS) in paragraphs [0088] and [0097].

Preferred diffusion hindered co-initiators include a polymeric co-initiator having a dendritic polymeric architecture, more preferably a hyperbranched polymeric architecture. Preferred hyperbranched polymeric co-initiators are those disclosed in US 2006014848 (AGFA) incorporated herein as a specific reference.

The radiation curable ink preferably comprises the diffusion hindered co-initiator in an amount of 0.1 to 50 wt %, more preferably in an amount of 0.5 to 25 wt %, most preferably in an amount of 1 to 10 wt % of the total weight of the ink.

Polymerization Inhibitors

The radiation curable inkjet ink may contain a polymerization inhibitor. Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol may also be used.

Suitable commercial inhibitors are, for example, SUMILIZER™ GA-80, SUMILIZER™ GM and SUMILIZER™ GS produced by Sumitomo Chemical Co. Ltd.; GENORAD™ 16, GENORAD™ 18 and GENORAD™ 20 from Rahn AG; IRGASTAB™ UV10 and IRGASTAB™ UV22, TINUVIN™ 460 and CGS20 from Ciba Specialty Chemicals; FLOORSTAB™ UV range (UV-1, UV-2, UV-5 and UV-8) from Kromachem Ltd, ADDITOL™ S range (S100, S110, S120 and S130) from Cytec Surface Specialties.

Since excessive addition of these polymerization inhibitors will lower the ink sensitivity to curing, it is preferred that the amount capable of preventing polymerization is determined prior to blending. The amount of a polymerization inhibitor is preferably lower than 2 wt % of the total inkjet ink.

Colorants

Colorants used in the radiation curable inks may be dyes, pigments or a combination thereof. Organic and/or inorganic pigments may be used. The colorant is preferably a pigment or a polymeric dye, most preferably a pigment.

The pigments may be black, white, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley-VCH, 2004. ISBN 3527305769.

Suitable pigments are disclosed in paragraphs [0128] to [0138] of WO 2008/074548 (AGFA GRAPHICS).

Also mixed crystals may be used. Mixed crystals are also referred to as solid solutions. For example, under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions. A commercially available example is CINQUASIA™ Magenta RT-355-D from Ciba Specialty Chemicals.

Also mixtures of pigments may be used in the pigment dispersions. For some inkjet applications, a neutral black inkjet ink is preferred and can be obtained, for example, by mixing a black pigment and a cyan pigment into the ink. The inkjet application may also require one or more spot colours, for example for packaging inkjet printing or textile inkjet printing. Silver and gold are often desired colours for inkjet poster printing and point-of-sales displays.

Non-organic pigments may be used in the pigment dispersions. Particular preferred pigments are C.I. Pigment Metal 1, 2 and 3. Illustrative examples of the inorganic pigments include red iron oxide (III), cadmium red, ultramarine blue, prussian blue, chromium oxide green, cobalt green, amber, titanium black and synthetic iron black.

Pigment particles in inkjet inks should be sufficiently small to permit free flow of the ink through the inkjet-printing device, especially at the ejecting nozzles. It is also desirable to use small particles for maximum colour strength and to slow down sedimentation.

The numeric average pigment particle size is preferably between 0.050 and 1 µm, more preferably between 0.070 and 0.300 µm and particularly preferably between 0.080 and 0.200 µm. Most preferably, the numeric average pigment particle size is no larger than 0.150 µm. An average particle size smaller than 0.050 µm is less desirable for decreased light-fastness, but mainly also because very small pigment particles or individual pigment molecules thereof may still be extracted in food packaging applications. The average particle size of pigment particles is determined with a Brookhaven Instruments Particle Sizer BI90plus based upon the principle of dynamic light scattering. The ink is diluted with ethyl acetate to a pigment concentration of 0.002 wt %. The measurement settings of the BI90plus are: 5 runs at 23° C., angle of 90°, wavelength of 635 nm and graphics=correction function.

However for white pigment dispersions, the numeric average particle diameter of the white pigment is preferably from 50 to 500 nm, more preferably from 150 to 400 nm, and most preferably from 200 to 350 nm. Sufficient hiding power cannot be obtained when the average diameter is less than 50 nm, and the storage ability and the jet-out suitability of the ink tend to be degraded when the average diameter exceeds 500 nm. The determination of the numeric average particle diameter is best performed by photon correlation spectroscopy at a wavelength of 633 nm with a 4 mW HeNe laser on a diluted sample of the pigmented inkjet ink. A suitable particle size analyzer used was a MALVERN™ nano-S available from Goffin-Meyvis. A sample can, for example, be prepared by addition of one drop of ink to a cuvette containing 1.5 mL ethyl acetate and mixed until a homogenous sample was obtained. The measured particle size is the average value of 3 consecutive measurements consisting of 6 runs of 20 seconds.

Suitable white pigments are given by Table 2 in [0116] of WO 2008/074548 (AGFA GRAPHICS). The white pigment is preferably a pigment with a refractive index greater than 1.60. The white pigments may be employed singly or in combination. Preferably titanium dioxide is used as pigment with a refractive index greater than 1.60. Suitable titanium dioxide pigments are those disclosed in [0117] and in [0118] of WO 2008/074548 (AGFA GRAPHICS).

The pigments are present in the range of 0.01 to 15%, more preferably in the range of 0.05 to 10% by weight and most preferably in the range of 0.1 to 5% by weight, each based on the total weight of the pigment dispersion. For white pigment dispersions, the white pigment is preferably present in an amount of 3% to 30% by weight of the pigment dispersion, and more preferably 5% to 25%. An amount of less than 3% by weight cannot achieve sufficient covering power and usually exhibits very poor storage stability and ejection property.
Polymeric Dispersants Typical polymeric dispersants are copolymers of two monomers but may contain three, four, five or even more monomers. The properties of polymeric dispersants depend on both the nature of the monomers and their distribution in the polymer. Copolymeric dispersants preferably have the following polymer compositions:

statistically polymerized monomers (e.g. monomers A and B polymerized into ABBAABAB);

alternating polymerized monomers (e.g. monomers A and B polymerized into ABABABAB);

gradient (tapered) polymerized monomers (e.g. monomers A and B polymerized into AAABAABBABBB);

block copolymers (e.g. monomers A and B polymerized into AAAAABBBBBB) wherein the block length of each of the blocks (2, 3, 4, 5 or even more) is important for the dispersion capability of the polymeric dispersant;

graft copolymers (graft copolymers consist of a polymeric backbone with polymeric side chains attached to the backbone); and mixed forms of these polymers, e.g. blocky gradient copolymers.

Suitable polymeric dispersants are listed in the section on "Dispersants", more specifically [0064] to [0070] and [0074] to [0077], in EP 1911814 A (AGFA GRAPHICS) incorporated herein as a specific reference.

The polymeric dispersant has preferably a number average molecular weight Mn between 500 and 30000, more preferably between 1500 and 10000.

The polymeric dispersant has preferably a weight average molecular weight Mw smaller than 100,000, more preferably smaller than 50,000 and most preferably smaller than 30,000.

The polymeric dispersant has preferably a polydispersity PD smaller than 2, more preferably smaller than 1.75 and most preferably smaller than 1.5.

Commercial examples of polymeric dispersants are the following:

DISPERBYK™ dispersants available from BYK CHEMIE GMBH;
SOLSPERSE™ dispersants available from NOVEON;
TEGO™ DISPERS™ dispersants from EVONIK;
EDAPLAN™ dispersants from MUNZING CHEMIE;
ETHACRYL™ dispersants from LYONDELL;
GANEX™ dispersants from ISP;
DISPEX™ and EFKA™ dispersants from CIBA SPECIALTY CHEMICALS INC;
DISPONER™ dispersants from DEUCHEM; and
JONCRYL™ dispersants from JOHNSON POLYMER.

Particularly preferred polymeric dispersants include SOLSPERSE™ dispersants from NOVEON, EFKA™ dispersants from CIBA SPECIALTY CHEMICALS INC and DISPERBYK™ dispersants from BYK CHEMIE GMBH. Particularly preferred dispersants are SOLSPERSE™ 32000, 35000 and 39000 dispersants from NOVEON.

The polymeric dispersant is preferably used in an amount of 2 to 600 wt %, more preferably 5 to 200 wt %, most preferably 50 to 90 wt % based on the weight of the pigment.
Dispersion Synergists A dispersion synergist usually consists of an anionic part and a cationic part. The anionic part of the dispersion synergist exhibiting a certain molecular similarity with the color pigment and the cationic part of the dispersion synergist consists of one or more protons and/or cations to compensate the charge of the anionic part of the dispersion synergist.

The synergist is preferably added in a smaller amount than the polymeric dispersant(s). The ratio of polymeric dispersant/dispersion synergist depends upon the pigment and should be determined experimentally. Typically the ratio wt % polymeric dispersant/wt % dispersion synergist is selected between 2:1 to 100:1, preferably between 2:1 and 20:1.

Suitable dispersion synergists that are commercially available include SOLSPERSE™ 5000 and SOLSPERSE™ 22000 from NOVEON.

Particular preferred pigments for the magenta ink used are a diketopyrrolo-pyrrole pigment or a quinacridone pigment. Suitable dispersion synergists include those disclosed in EP 1790698 A (AGFA GRAPHICS), EP 1790696 A (AGFA GRAPHICS), WO 2007/060255 (AGFA GRAPHICS) and EP 1790695 A (AGFA GRAPHICS).

In dispersing C.I. Pigment Blue 15:3, the use of a sulfonated Cu-phthalocyanine dispersion synergist, e.g. SOLSPERSE™ 5000 from NOVEON is preferred. Suitable dispersion synergists for yellow inkjet inks include those disclosed in EP 1790697 A (AGFA GRAPHICS).
Surfactants Surfactants are known for use in inkjet inks to reduce the surface tension of the ink in order to reduce the contact angle on the substrate, i.e. to improve the wetting of the substrate by the ink. On the other hand, the jettable ink must meet stringent performance criteria in order to be adequately jettable with high precision, reliability and during an extended period of time. To achieve both wetting of the substrate by the ink and high jetting performance, typically, the surface tension of the ink is reduced by the addition of one or more surfactants. In the case of curable inkjet inks, however, the surface tension of the inkjet ink is not only determined by the amount and type of surfactant, but also by the polymerizable compounds, the polymeric dispersants and other additives in the ink composition.

The surfactant(s) can be anionic, cationic, non-ionic, or zwitter-ionic and are usually added in a total quantity less than 20 wt % based on the total weight of the inkjet ink and particularly in a total less than 10 wt % based on the total weight of the inkjet ink.

Suitable surfactants include fluorinated surfactants, fatty acid salts, ester salts of a higher alcohol, alkylbenzene sulphonate salts, sulphosuccinate ester salts and phosphate ester salts of a higher alcohol (for example, sodium dodecylbenzenesulphonate and sodium dioctylsulphosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

Preferred surfactants include fluoro surfactants (such as fluorinated hydrocarbons) and silicone surfactants. The silicones are typically siloxanes and can be alkoxylated, polyether modified, polyester modified, polyether modified hydroxy functional, amine modified, epoxy modified and other modifications or combinations thereof. Preferred siloxanes are polymeric, for example polydimethylsiloxanes.

The fluorinated or silicone compound used as a surfactant may be a cross-linkable surfactant. Suitable copolymerizable compounds having surface-active effects include, for example, polyacrylate copolymers, silicone modified acrylates, silicone modified methacrylates, acrylated siloxanes, polyether modified acrylic modified siloxanes, fluorinated acrylates, and fluorinated methacrylate. These acrylates can be mono-, di-, tri- or higher functional (meth)acrylates.

Depending upon the application a surfactant can be used with a high, low or intermediate dynamic surface tension. Silicone surfactants are generally known to have low dynamic surface tensions while fluorinated surfactants are known to have higher dynamic surface tensions.

Silicone surfactants are often preferred in curable inkjet inks, especially the reactive silicone surfactants, which are able to be polymerized together with the polymerizable compounds during the curing step.

Examples of useful commercial silicone surfactants are those supplied by BYK CHEMIE GMBH (including BYK™-302, 307, 310, 331, 333, 341, 345, 346, 347, 348, UV3500, UV3510 and UV3530), those supplied by TEGO CHEMIE SERVICE (including Tego RAD™ 2100, 2200N, 2250, 2300, 2500, 2600 and 2700), EBECRYL™ 1360 a polysilixone hexaacrylate from CYTEC INDUSTRIES BV and EFKA™-3000 series (including EFKA™-3232 and EFKA™-3883) from EFKA CHEMICALS B.V.

Preparation of Pigment Dispersions and Inks

Pigment dispersions may be prepared by precipitating or milling the pigment in the dispersion medium in the presence of the dispersant.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

Many different types of materials may be used as milling media, such as glasses, ceramics, metals, and plastics. In a preferred embodiment, the grinding media can comprise particles, preferably substantially spherical in shape, e.g. beads consisting essentially of a polymeric resin or yttrium stabilized zirconium beads.

In the process of mixing, milling and dispersion, each process is performed with cooling to prevent build up of heat, and for radiation curable pigment dispersions as much as possible under light conditions in which actinic radiation has been substantially excluded.

The pigment dispersion may contain more than one pigment. Such a pigment dispersion may be prepared using separate dispersions for each pigment, or alternatively several pigments may be mixed and co-milled in preparing the dispersion.

The dispersion process can be carried out in a continuous, batch or semi-batch mode.

The preferred amounts and ratios of the ingredients of the mill grind will vary widely depending upon the specific materials and the intended applications. The contents of the milling mixture comprise the mill grind and the milling media. The mill grind comprises pigment, polymeric dispersant and a liquid carrier. For inkjet inks, the pigment is usually present in the mill grind at 1 to 50 wt %, excluding the milling media. The weight ratio of pigment over polymeric dispersant is 20:1 to 1:2.

The milling time can vary widely and depends upon the pigment, the selected mechanical devices and residence conditions, the initial and desired final particle size, etc. In a preferred embodiment of the present invention pigment dispersions with an average particle size of less than 100 nm may be prepared.

After milling is completed, the milling media is separated from the milled particulate product (in either a dry or liquid dispersion form) using conventional separation techniques, such as by filtration, sieving through a mesh screen, and the like. Often the sieve is built into the mill, e.g. for a bead mill. The milled pigment concentrate is preferably separated from the milling media by filtration.

In general it is desirable to make inkjet inks in the form of a concentrated mill grind, which is subsequently diluted to the appropriate concentration for use in the inkjet printing system. This technique permits preparation of a greater quantity of pigmented ink from the equipment. By dilution, the inkjet ink is adjusted to the desired viscosity, surface tension, colour, hue, saturation density, and print area coverage for the particular application.

Inkjet Printing Methods

The inkjet printing method according to a preferred embodiment of the present invention includes the steps of:

a) providing a substantially non-absorbing ink-receiver;

b) providing a free radical radiation curable inkjet ink as defined above; and c) inkjet printing the inkjet ink on the substantially non-absorbing ink-receiver.

In a preferred embodiment of the inkjet printing method, the free radical radiation curable inkjet ink is a white inkjet ink, preferably containing a titanium dioxide pigment. White inkjet inks can be advantageously used, for example, on transparent substrates to enhance the contrast and the vividness of colour inks. White curable inks are then either used for so-called "surface printing" or "backing printing" to form a reflection image on a transparent substrate. In surface printing, a white background is formed on a transparent substrate using a white ink and further thereon, a color image is printed, where after the formed final image is viewed from the printed face.

In so-called backing printing, a color image is formed on a transparent substrate using color inks and then a white ink is applied onto the color inks, and the final formed image is observed through the transparent substrate. In a preferred embodiment a colour inkjet ink is jetted on partially cured white inkjet ink. If the white ink is only partially cured, an improved wettability of the colour ink on the white ink layer is observed.

Partially curing immobilizes the ink on the substrate surface. A quick test to verify that the white inkjet ink is partially cured can be done by rubbing a finger or a cloth across the printed surface, whereby it is observed that ink can be smeared or smudged on the surface Inkjet Printing Devices The inkjet inks according to a preferred embodiment of the present invention may be jetted by one or more print heads ejecting small droplets of ink in a controlled manner through nozzles onto an ink-receiver surface, which is moving relative to the print head(s).

A preferred print head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the print head. However the inkjet printing method according to the present invention is not restricted to piezoelectric inkjet printing. Other inkjet print heads can be used and include various types, such as a continuous type and thermal, electrostatic and acoustic drop on demand type.

The inkjet print head normally scans back and forth in a transversal direction across the moving ink-receiver surface. Often the inkjet print head does not print on the way back.

Bi-directional printing is preferred for obtaining a high areal throughput. Another preferred printing method is by a "single pass printing process", which can be performed by using page wide inkjet print heads or multiple staggered inkjet print heads which cover the entire width of the ink-receiver surface. In a single pass printing process the inkjet print heads usually remain stationary and the ink-receiver surface is transported under the inkjet print heads.

Curing Devices

The radiation curable inkjet inks according to a preferred embodiment of the present invention can be cured by exposing them to actinic radiation, preferably by ultraviolet radiation.

In inkjet printing, the curing device may be arranged in combination with the print head of the inkjet printer, travelling therewith so that the curable composition is exposed to curing radiation very shortly after been jetted.

In such an arrangement it can be difficult to provide a small enough radiation source connected to and travelling with the print head. Therefore, a static fixed radiation source may be employed, e.g. a source of curing UV-light, connected to the radiation source by flexible radiation conductor such as a fiber optic bundle or an internally reflective flexible tube.

Alternatively, the actinic radiation may be supplied from a fixed source to the radiation head by an arrangement of mirrors including a mirror upon the radiation head.

The source of radiation arranged not to move with the print head, may also be an elongated radiation source extending transversely across the ink-receiver surface to be cured and adjacent the transverse path of the print head so that the subsequent rows of images formed by the print head are passed, stepwise or continually, beneath that radiation source.

Any ultraviolet light source, as long as part of the emitted light can be absorbed by the photo-initiator or photo-initiator system, may be employed as a radiation source, such as, a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:
UV-A: 400 nm to 320 nm
UV-B: 320 nm to 290 nm
UV-C: 290 nm to 100 nm.

Furthermore, it is possible to cure the image using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages e.g. a fast curing speed and a high curing degree.

For facilitating curing, the inkjet printer often includes one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

EXAMPLES

Materials

All materials used in the following examples were readily available from standard sources such as Aldrich Chemical Co. (Belgium) and Acros (Belgium) unless otherwise specified.

PB15:4 is an abbreviation used for HOSTAPERM™ Blue P-BFS, a C.I. Pigment Blue 15:4 pigment from CLARIANT.

DB162 is an abbreviation used for the polymeric dispersant DISPERBYK™ 162 available from BYK CHEMIE GMBH whereof the solvent mixture of 2-methoxy-1-methylethylacetate, xylene and n-butylacetate was removed.

INHIB is a mixture forming a polymerization inhibitor having a composition according to Table 1.

TABLE 1

| Component | wt % |
|---|---|
| DPGDA | 82.4 |
| p-methoxyphenol | 4.0 |
| 2,6-di-tert-butyl-4-methylphenol | 10.0 |
| CUPFERRON ™ AL | 3.6 |

CUPFERRON™ AL is aluminum N-nitrosophenylhydroxylamine from WAKO CHEMICALS LTD.

EPD is ethyl 4-dimethylaminobenzoate, available under the trade name of GENOCURE™ EPD from RAHN AG.

ITX is DAROCUR™ ITX is an isomeric mixture of 2- and 4-isopropylthioxanthone from CIBA SPECIALTY CHEMICALS IRGACURE™ 907 is 2-methyl-1-[4-(methylthio)phenyl]-2-morpholino-propan-1-one, a photoinitiator available from CIBA SPECIALTY CHEMICALS.

BYK™ UV 3510 is a polyether modified polydimethylsiloxane wetting agent available from BYK CHEMIE GMBH.

VCL is N-vinyl caprolactam available from BASF BELGIUM, NV.

VEEA is 2-(vinyloxyethoxy)ethyl acrylate, a difunctional monomer available from NIPPON SHOKUBAI, Japan:

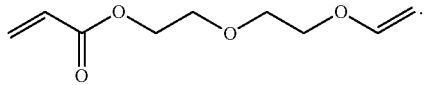

DPGDA is dipropyleneglycoldiacrylate from SARTOMER.

TBCH is 4-tert.butylcyclohexylacrylate available under the trade name of Sartomer CD217 from SARTOMER. TBCH has a glass transition temperature $T_g$ of 47° C.

THFA is tetrahydrofurfuryl acrylate available as Sartomer SR285 from SARTOMER. THFA has a $T_g$ of −28° C.

PEA is 2-phenoxyethyl acrylate available as SARTOMER™ SR339C from SARTOMER. PEA has a $T_g$ of 5° C.

SR351 is trimethylolpropane triacrylate available as SARTOMER™ SR351 from SARTOMER.

SR454 is an ethoxylated trimethylolpropane triacrylate containing three ethoxy units having a molecular weight of 428 and available as SARTOMER™ SR454 from SARTOMER.

SR499 is an ethoxylated (6) trimethylolpropane triacrylate containing six ethoxy units having a molecular weight of 560 and available as SARTOMER™ SR499 from SARTOMER.

SR502 is an ethoxylated (9) trimethylolpropane triacrylate containing nine ethoxy units available as SARTOMER™ SR502 from SARTOMER.

CN435 is an ethoxylated (15) trimethylolpropane triacrylate containing fifteen ethoxy units having a molecular weight of 956 and available as SARTOMER™ SR9035 from SARTOMER.

SR415 is an ethoxylated trimethylolpropane triacrylate containing twenty ethoxy units having a molecular weight of 1088 and available as SARTOMER™ SR415 from SARTOMER.

SR344 is a polyethyleneglycol diacrylate containing nine ethoxy units having a molecular weight of 522 and available as SARTOMER™ SR344 from SARTOMER.

SR610 is a polyethyleneglycol diacrylate containing fourteen ethoxy units having a molecular weight of 742 and available as SARTOMER™ SR610 from SARTOMER.

SR9021 is a propoxylated glyceryl triacrylate having a molecular weight of 573 and available as SARTOMER™ SR9021 from SARTOMER.

G1122 is a monofunctional urethane acrylate having a $T_g$ of $-3°$ C. and available as GENOMER™ 1122 from RAHN having the Formula (II):

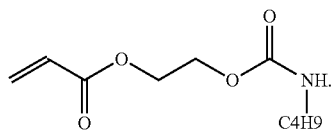

Formula (II)

cTMPFA is cyclic trimethylolpropane formal acrylate available as SARTOMER™ SR531 from SARTOMER.

IBOA is isobornylacrylate available as SARTOMER™ SR506D from SARTOMER.

PET100 is a 100 μm unsubbed PET substrate with on the backside an antiblocking layer with antistatic properties available from AGFA-GEVAERT as P100C PLAIN/ABAS.

PP1 is a polypropylene substrate for which PRIPLAK™ Classic available from ANTALIS, Belgium and manufactured by PRIPLAK, France was used.

PP2 is a polypropylene substrate for which Buplex PP—3 mm—Corona Treated from Buhrmann/Ubens was used.

PP3 is a polypropylene substrate for which BiPrint 650 gr 3.5 mm from ANTALIS, Belgium was used.

PVC1 is a polyvinylchloride substrate for which FOREX™ Classic available from ANTALIS, Belgium and manufactured by ALCAN AIREX, Germany was used.

PVC2 is a polyvinylchloride substrate for which PENSTICK™ 5155 WH available from ANTALIS, Belgium and manufactured by MOLCO, Belgium was used.

PVC3 is a polyvinylchloride substrate for which MetaMark MD5-100 from METAMARK, UK was used.

PS is a polystyrene substrate for which IROSTYRENE™ MAT from ANTALIS, Belgium and manufactured by IROPLASTICS, Austria was used.

PC is a polycarbonate substrate for which BARLO™ TL 30% available from ANTALIS, Belgium and manufactured by BARLO, Germany was used.

PMMA is polymethylmethacrylate substrate for which BARLO™ XT from ANTALIS, Belgium and manufactured by BARLO, Germany was used.

Measurement Methods

1. Flexibility

A radiation curable inkjet ink was coated on a Metamark MD5-100 substrate using a bar coater and a 10 μm wired bar. The coated sample was fully cured using a Fusion DRSE-120 conveyer, equipped with a Fusion VPS/1600 lamp (D-bulb), which transported the samples under the UV-lamp on a conveyer belt at a speed of 20 m/min.

The flexibility was determined using a custom built apparatus shown in the FIGURE for stretching a strip having a length of 8 cm and a width of 1 cm obtained from the coated sample using a cutter. The strip was mounted between a first fixed wall and a second wall which could be horizontally displaced by rotation of a handle.

The strip was elongated from an original length L1 of 5 cm to the length L2 at which the strip ruptured. The elongation was calculated as a percentage according to Formula (III):

$$\text{Elongation}(\%) = (L2-L1/L1) \times 100 \quad \text{(III)}.$$

The evaluation of the flexibility was made in accordance with the classification described in Table 2.

TABLE 2

| Classification | Observation |
|---|---|
| A | 35% elongation or more |
| B | From 25% to less than 35% elongation |
| C | From 20% to less than 25% elongation |
| D | Less than 20% elongation |

2. Curing Speed

A radiation curable inkjet ink was coated on a PET100 substrate using a bar coater and a 10 μm wired bar. The coated sample was cured using a Fusion DRSE-120 conveyer, equipped with a Fusion VPS/1600 lamp (D-bulb), which transported the samples under the UV-lamp on a conveyer belt at a speed of 20 m/min. The maximum output of the lamp was 1.05 J/cm² and a peak intensity of 5.6 W/cm². The percentage of the maximum output of the lamp was taken as a measure for curing speed, the lower the number the higher the curing speed. A sample was considered as fully cured at the moment scratching with a Q-tip caused no visual damage.

The evaluation was made in accordance with the classification described in Table 3.

TABLE 3

| Classification | Percentage of the maximum output of the lamp required fro fully cured sample |
|---|---|
| A | Less than 50% |
| B | From 50% to less than 75% |
| C | From 75% to less than 100% |
| D | 100% or sample not fully cured |

Table 4 shows the maximum peak intensity (MPI) in W/cm² and the dose in J/cm² of the D-bulb for the different UV regions measured with a UV Power Puck 8651 from EIT Inc. (USA) at different settings of the lamp output for a belt speed of 20 m/min.

TABLE 4

| Lamp | UVC (250-260 nm) | | UVB (280-320 nm) | | UVA (320-390 nm) | | UVF (395-445 nm) | |
|---|---|---|---|---|---|---|---|---|
| Output | MPI | Dose | MPI | Dose | MPI | Dose | MPI | Dose |
| 100% | 0.06 | 0.01 | 0.78 | 0.14 | 3.16 | 0.59 | 1.63 | 0.31 |
| 80% | 0.05 | 0.01 | 0.55 | 0.11 | 2.12 | 0.40 | 1.10 | 0.20 |
| 60% | 0.04 | 0.01 | 0.42 | 0.08 | 1.35 | 0.26 | 0.64 | 0.12 |
| 40% | 0.03 | 0.01 | 0.26 | 0.05 | 0.51 | 0.09 | 0.24 | 0.04 |

3. Average Adhesion

A radiation curable inkjet ink was coated on a PET100 substrate using a bar coater and a 10 μm wired bar. The coated sample was fully cured using a Fusion DRSE-120 conveyer, equipped with a Fusion VPS/1600 lamp (D-bulb), which transported the samples under the UV-lamp on a conveyer belt at a speed of 20 m/min.

The adhesion is evaluated by a cross-cut test according to ISO2409:1992(E). Paints. *International standard*. 1992-08-15. using a Braive No. 1536 Cross Cut Tester from BRAIVE INSTRUMENTS with spacing of a 1 mm between cuts and using a weight of 600 g, in combination with a TESATAPE™ 4104 PVC tape.

The evaluation was made in accordance with the evaluation values described in Table 5.

TABLE 5

| Evaluation value | Observation |
| --- | --- |
| 0 | The edges of the cuts are completely smooth: none of the squares of the lattice is detached (= perfect adhesion). |
| 1 | Detachment of small flakes of the coating at the intersections of the cuts. A cross-cut area not greater than 5% is affected. |
| 2 | The coating has flaked along the edges and/or at the intersections of the cuts. A cross-cut area greater than 5%, but not significantly greater than 15%, is affected. |
| 3 | The coating has flaked along the edges of the cuts partly or wholly in large ribbons, and/or it has flaked partly or wholly on different parts of the squares. A cross-cut area significantly greater than 15%, but not significantly greater than 35%, is affected. |
| 4 | The coating has flaked along the edges of the cuts in large ribbons, and/or some of the squares has detached partly or wholly. A cross-cut area significantly greater than 35%, but not significantly greater than 65%, is affected. |
| 5 | Any degree of flaking that cannot even be classified by classification 4. |

The adhesion was evaluated on a number of different substrates for each inkjet ink. The average adhesion is the sum of the evaluation values for each tested substrated divided by the total number of substrates. The evaluation of the average adhesion was made in accordance with the classification described in Table 6.

TABLE 6

| Classification | Average adhesion |
| --- | --- |
| A | Less than 3 |
| B | From 3 to less than 4 |
| C | From 4 to less than 5 |
| D | Evaliuation value 5 on all substrates |

4. Scratch Resistance

A radiation curable inkjet ink was coated on a PET100 substrate using a bar coater and a 10 μm wired bar. The coated sample was fully cured using a Fusion DRSE-120 conveyer, equipped with a Fusion VPS/1600 lamp (D-bulb), which transported the samples under the UV-lamp on a conveyer belt at a speed of 20 m/min.

Scratch Test 1

The scratch resistance of the coated sample of a radiation curable inkjet was determined using an ELCOMETER™ 3092 Sclerometer Hardness Tester equipped with a 0.75 mm (0.03") diameter tungsten carbide tip. The body of the instrument contained a round tip, compressed by one of the three springs corresponding to the three printed scales: 0-300, 0-1000, 0-2000 g, and a cursor fitted with a screw lock. By making short, straight movements while gradually increasing the load, the force was observed at which the tip left a mark or destroyed the coating.

Scratch Test 2

The scratch resistance of the coated sample of a radiation curable inkjet was determined according to ISO 4586-2:2004 (E) using a Rockwell indenter with parameters: Speed 30 mm/sec; Load: 10-200 mN; Test area length 100 mm; and Tip: diamond: r 76 μm, 90°.

This test ran a diamond topped needle across the ink surface while the pressure onto the needle was increased. The test started with a pressure of 10 mN and then went up to 200 mN. The result of the Rockwell indenter scratch test was always the pressure value which revealed the first microscopic cracks in the pressure trail of the needle. So, the position where the needle started to penetrate the ink layer, marked the maximum force applicable to the layer without scratching it.

The evaluation of the scratch resistance was made in accordance with the classification described in Table 7 using either Scratch Test 1 or Scratch Test 2.

TABLE 7

| | Observation | |
| --- | --- | --- |
| Classification | Scratch Test 1 | Scratch Test 2 |
| A | No scratch at 8 N | No scratch at 100 mN |
| B | No scratch at 7 N | No scratch from 75 mN to less than 100 mN |
| C | No scratch at 5 N | No scratch from 50 mN to less than 75 mN |
| D | Scratch at 5 N | Scratch at less than 50 mN |

5. Viscosity

The viscosity of the formulations was measured at 45° C. using a "Robotic Viscometer Type VISCObot" from CAMBRIDGE APPLIED SYSTEMS.

A viscosity of less than 20 mPa·s at 45° C. was required for inkjet printing. Preferably the viscosity was less than 15 mPa·s at 45° C.

Example 1

This example illustrates how inkjet inks in accordance with the invention improve simultaneously the flexibility and scratch resistance, while maintaining low viscosity for jetting performance, a high cure speed and a good adhesion to a wide range of substrates.

Preparation of Inkjet Inks

All the comparative inkjet inks COMP-1 to COMP-120 and the inventive inkjet inks INV-1 to INV-35 were all prepared in the same manner.

First a concentrated cyan pigment dispersion CPD1 was prepared. 500 g of the polymeric dispersant DB162 and 33 g of the polymerization inhibitor INHIB were dissolved in 3870 g of DPGDA in a vessel of 6 L using a DISPERLUX™ disperser (from DISPERLUX S.A.R.L., Luxembourg). 1000 g of cyan pigment PB15:4 was added to the solution and stirred for 30 minutes. The vessel was then connected to a Bachofen DYNOMILL ECM Pilot mill having an internal volume of 1.5 L filled for 42% with 0.4 mm yttrium stabilized zirconia beads ("high wear resistant zirconia grinding media" from TOSOH Co.). The mixture was circulated over the mill for 2 hours and 18 minutes at a flow rate of about 2 L per minute and a rotation speed in the mill of about 13 m/s. 1667 g of a 30 wt % solution of DB162 in DPGDA was added to the pigment dispersion and circulated over the mill for another 20 minutes. During the complete milling procedure the content in the mill was cooled to a temperature of 42° C. After milling, the concentrated pigment dispersion CPD1 was discharged into another 6 L vessel. The resulting concentrated pigment dispersion CPD1 had a composition according to Table 8.

TABLE 8

| Component | wt % |
|---|---|
| PB15:4 | 15 |
| DB162 | 15 |
| INHIB | 1 |
| DPGDA | 69 |

Then the comparative inkjet inks COMP-1 to COMP-120 and the inventive inkjet inks INV-1 to INV-35 were prepared by combining the concentrated pigment dispersion CPD1 with the components according to Table 9. The polymerizable compounds used in each inkjet ink are given by Table 10.

TABLE 9

| Component | wt % of the components |
|---|---|
| PB15:4 | 3.0 |
| DB162 | 3.0 |
| EPD | 2.5 |
| ITX | 2.0 |
| IRGACURE ™ 907 | 5.0 |
| BYK ™ UV 3510 | 0.1 |
| INHIB | 1.0 |
| Polymerizable compounds | 83.4 (according to Table 10) |

TABLE 10

| Inkjet Ink | DPGDA | Non-cyclic monomer | | Cyclic Monomer with Tg < 20° C. | | TBCH | VCL | VEEA | EO/PO Polyacrylate | |
|---|---|---|---|---|---|---|---|---|---|---|
| COMP-1 | 23.4 | SR454 | 60.0 | — | | — | — | — | — | — |
| COMP-2 | 23.4 | G1122 | 60.0 | — | | — | — | — | — | — |
| COMP-3 | 38.4 | SR454 | 30.0 | THFA | 15.0 | — | — | — | — | — |
| COMP-4 | 23.4 | SR454 | 45.0 | THFA | 15.0 | — | — | — | — | — |
| COMP-5 | 38.4 | G1122 | 15.0 | THFA | 30.0 | — | — | — | — | — |
| COMP-6 | 23.4 | SR454 | 30.0 | THFA | 30.0 | — | — | — | — | — |
| COMP-7 | 23.4 | — | — | THFA | 60.0 | — | — | — | — | — |
| COMP-8 | 53.4 | G1122 | 15.0 | PEA | 15.0 | — | — | — | — | — |
| COMP-9 | 38.4 | SR454 | 30.0 | PEA | 15.0 | — | — | — | — | — |
| COMP-10 | 38.4 | G1122 | 30.0 | PEA | 15.0 | — | — | — | — | — |
| COMP-11 | 23.4 | SR454 | 45.0 | PEA | 15.0 | — | — | — | — | — |
| COMP-12 | 23.4 | G1122 | 45.0 | PEA | 15.0 | — | — | — | — | — |
| COMP-13 | 38.4 | G1122 | 15.0 | PEA | 30.0 | — | — | — | — | — |
| COMP-14 | 23.4 | SR454 | 30.0 | PEA | 30.0 | — | — | — | — | — |
| COMP-15 | 23.4 | G1122 | 30.0 | PEA | 30.0 | — | — | — | — | — |
| COMP-16 | 23.4 | SR454 | 15.0 | PEA | 45.0 | — | — | — | — | — |
| COMP-17 | 23.4 | — | — | PEA | 60.0 | — | — | — | — | — |
| COMP-18 | 53.4 | — | — | PEA | 15.0 | — | — | — | CN435 | 15.0 |
| COMP-19 | 38.4 | — | — | PEA | 30.0 | — | — | — | CN435 | 15.0 |
| COMP-20 | 38.4 | — | — | PEA | 15.0 | — | — | — | CN435 | 30.0 |
| COMP-21 | 23.4 | — | — | PEA | 30.0 | — | — | — | CN435 | 30.0 |
| COMP-22 | 23.4 | — | — | THFA | 15.0 | — | — | — | CN435 | 45.0 |
| COMP-23 | 23.4 | — | — | PEA | 15.0 | — | — | — | CN435 | 45.0 |
| COMP-24 | 53.4 | SR454 | 15.0 | — | — | — | — | 15.0 | — | — |
| COMP-25 | 53.4 | G1122 | 15.0 | — | — | — | — | 15.0 | — | — |
| COMP-26 | 38.4 | SR454 | 30.0 | — | — | — | 15.0 | — | — | — |
| COMP-27 | 38.4 | G1122 | 30.0 | — | — | — | 15.0 | — | — | — |
| COMP-28 | 38.4 | SR454 | 30.0 | — | — | — | — | 15.0 | — | — |
| COMP-29 | 38.4 | G1122 | 30.0 | — | — | — | — | 15.0 | — | — |
| COMP-30 | 23.4 | SR454 | 45.0 | — | — | — | 15.0 | — | — | — |
| COMP-31 | 23.4 | G1122 | 45.0 | — | — | — | 15.0 | — | — | — |
| COMP-32 | 23.4 | SR454 | 45.0 | — | — | — | — | 15.0 | — | — |
| COMP-33 | 23.4 | G1122 | 45.0 | — | — | — | — | 15.0 | — | — |
| COMP-34 | 38.4 | SR454 | 15.0 | THFA | 15.0 | — | 15.0 | — | — | — |
| COMP-35 | 53.4 | — | — | THFA | 15.0 | — | — | 15.0 | — | — |
| COMP-36 | 38.4 | SR454 | 15.0 | THFA | 15.0 | — | — | 15.0 | — | — |
| COMP-37 | 23.4 | SR454 | 30.0 | THFA | 15.0 | — | 15.0 | — | — | — |
| COMP-38 | 23.4 | G1122 | 30.0 | THFA | 15.0 | — | 15.0 | — | — | — |
| COMP-39 | 23.4 | SR454 | 30.0 | THFA | 15.0 | — | — | 15.0 | — | — |
| COMP-40 | 23.4 | G1122 | 30.0 | THFA | 15.0 | — | — | 15.0 | — | — |
| COMP-41 | 38.4 | — | — | THFA | 30.0 | — | 15.0 | — | — | — |
| COMP-42 | 23.4 | SR454 | 15.0 | THFA | 30.0 | — | 15.0 | — | — | — |
| COMP-43 | 23.4 | G1122 | 15.0 | THFA | 30.0 | — | 15.0 | — | — | — |
| COMP-44 | 38.4 | G1122 | 15.0 | PEA | 15.0 | — | — | 15.0 | — | — |
| COMP-45 | 23.4 | G1122 | 30.0 | PEA | 15.0 | — | 15.0 | — | — | — |
| COMP-46 | 23.4 | G1122 | 30.0 | PEA | 15.0 | — | — | 15.0 | — | — |
| COMP-47 | 38.4 | — | — | PEA | 30.0 | — | 15.0 | — | — | — |

TABLE 10-continued

| Inkjet Ink | DPGDA | Non-cyclic monomer | | Cyclic Monomer with Tg < 20° C. | | TBCH | VCL | VEEA | EO/PO Polyacrylate | |
|---|---|---|---|---|---|---|---|---|---|---|
| COMP-48 | 23.4 | G1122 | 15.0 | PEA | 30.0 | — | 15.0 | — | — | — |
| COMP-49 | 23.4 | SR454 | 15.0 | PEA | 30.0 | — | — | 15.0 | — | — |
| COMP-50 | 23.4 | G1122 | 15.0 | PEA | 30.0 | — | — | 15.0 | — | — |
| COMP-51 | 53.4 | — | — | — | — | — | — | 15.0 | CN435 | 15.0 |
| COMP-52 | 23.4 | — | — | — | — | — | 15.0 | — | CN435 | 45.0 |
| COMP-53 | 23.4 | — | — | — | — | — | — | 15.0 | CN435 | 45.0 |
| COMP-54 | 23.4 | SR454 | 30.0 | — | — | — | 15.0 | 15.0 | — | — |
| COMP-55 | 23.4 | G1122 | 30.0 | — | — | — | 15.0 | 15.0 | — | — |
| COMP-56 | 38.4 | SR454 | 15.0 | — | — | — | — | 30.0 | — | — |
| COMP-57 | 38.4 | G1122 | 15.0 | — | — | — | — | 30.0 | — | — |
| COMP-58 | 23.4 | SR454 | 30.0 | — | — | — | 30.0 | — | — | — |
| COMP-59 | 23.4 | G1122 | 30.0 | — | — | — | 30.0 | — | — | — |
| COMP-60 | 23.4 | SR454 | 30.0 | — | — | — | — | 30.00 | — | — |
| COMP-61 | 23.4 | G1122 | 30.0 | — | — | — | — | 30.00 | — | — |
| COMP-62 | 38.4 | — | — | THFA | 15.0 | — | — | 30.00 | — | — |
| COMP-63 | 23.4 | SR454 | 15.0 | THFA | 15.0 | — | — | 30.00 | — | — |
| COMP-64 | 38.4 | — | — | PEA | 15.0 | — | 30.0 | — | — | — |
| COMP-65 | 23.4 | SR454 | 15.0 | PEA | 15.0 | — | 30.0 | — | — | — |
| COMP-66 | 23.4 | G1122 | 15.0 | PEA | 15.0 | — | 30.0 | — | — | — |
| COMP-67 | 38.4 | — | — | PEA | 15.0 | — | — | 30.0 | — | — |
| COMP-68 | 23.4 | SR454 | 15.0 | PEA | 15.0 | — | — | 30.0 | — | — |
| COMP-69 | 23.4 | — | — | THFA | 15.0 | — | 30.0 | — | CN435 | 15.0 |
| COMP-70 | 23.4 | — | — | THFA | 15.0 | — | — | 30.00 | CN435 | 15.0 |
| COMP-71 | 23.4 | SR454 | 15.0 | — | — | — | 45.0 | — | — | — |
| COMP-72 | 23.4 | G1122 | 15.0 | — | — | — | 45.0 | — | — | — |
| COMP-73 | 23.4 | SR454 | 15.0 | — | — | — | — | 45.0 | — | — |
| COMP-74 | 23.4 | — | — | PEA | 15.0 | — | 45.0 | — | — | — |
| COMP-75 | 23.4 | — | — | — | — | — | 60.0 | — | — | — |
| COMP-76 | 23.4 | — | — | — | — | — | — | 60.0 | — | — |
| COMP-77 | 53.4 | SR454 | 15.0 | — | — | 15.0 | — | — | — | — |
| COMP-78 | 53.4 | G1122 | 15.0 | — | — | 15.0 | — | — | — | — |
| COMP-79 | 38.4 | SR454 | 30.0 | — | — | 15.0 | — | — | — | — |
| COMP-80 | 38.4 | G1122 | 30.0 | — | — | 15.0 | — | — | — | — |
| COMP-81 | 23.4 | SR454 | 45.0 | — | — | 15.0 | — | — | — | — |
| COMP-82 | 23.4 | G1122 | 45.0 | — | — | 15.0 | — | — | — | — |
| COMP-83 | 53.4 | — | — | — | — | 15.0 | — | — | CN435 | 15.0 |
| COMP-84 | 23.4 | — | — | — | — | 15.0 | — | — | CN435 | 45.0 |
| COMP-85 | 38.4 | G1122 | 15.0 | — | — | 15.0 | 15.0 | — | — | — |
| COMP-86 | 53.4 | — | — | — | — | 15.0 | — | 15.0 | — | — |
| COMP-87 | 38.4 | SR454 | 15.0 | — | — | 15.0 | — | 15.0 | — | — |
| COMP-88 | 23.4 | SR454 | 30.0 | — | — | 15.0 | 15.0 | — | — | — |
| COMP-89 | 23.4 | SR454 | 30.0 | — | — | 15.0 | — | 15.0 | — | — |
| COMP-90 | 38.4 | SR454 | 15.0 | — | — | 15.0 | 15.0 | — | — | — |
| COMP-91 | 23.4 | SR454 | 30.0 | — | — | 15.0 | 15.0 | — | — | — |
| COMP-92 | 23.4 | G1122 | 30.0 | — | — | 15.0 | 15.0 | — | — | — |
| COMP-93 | 38.4 | — | — | — | — | 15.0 | 30.0 | — | — | — |
| COMP-94 | 38.4 | — | — | — | — | 15.0 | — | 30.0 | — | — |
| COMP-95 | 23.4 | SR454 | 15.0 | — | — | 15.0 | — | 30.0 | — | — |
| COMP-96 | 23.4 | SR351 | 15.0 | — | — | 15.0 | 30.0 | — | — | — |
| COMP-97 | 23.4 | G1122 | 15.0 | — | — | 15.0 | 30.0 | — | — | — |
| COMP-98 | 23.4 | — | — | — | — | 15.0 | 45.0 | — | — | — |
| COMP-99 | 23.4 | — | — | — | — | 15.0 | — | 45.0 | — | — |
| COMP-100 | 38.4 | SR454 | 15.0 | — | — | 30.0 | — | — | — | — |
| COMP-101 | 38.4 | G1122 | 15.0 | — | — | 30.0 | — | — | — | — |
| COMP-102 | 23.4 | SR454 | 30.0 | — | — | 30.0 | — | — | — | — |
| COMP-103 | 23.4 | G1122 | 30.0 | — | — | 30.0 | — | — | — | — |
| COMP-104 | 38.4 | — | — | — | — | 30.0 | — | — | CN435 | 15.0 |
| COMP-105 | 23.4 | — | — | — | — | 30.0 | — | — | CN435 | 30.0 |
| COMP-106 | 38.4 | — | — | — | — | 30.0 | 15.0 | — | — | — |
| COMP-107 | 23.4 | SR454 | 15.0 | — | — | 30.0 | 15.0 | — | — | — |
| COMP-108 | 23.4 | G1122 | 15.0 | — | — | 30.0 | 15.0 | — | — | — |
| COMP-109 | 38.4 | — | — | — | — | 30.0 | — | 15.0 | — | — |
| COMP-110 | 23.4 | SR454 | 15.0 | — | — | 30.0 | — | 15.0 | — | — |
| COMP-111 | 23.4 | G1122 | 15.0 | — | — | 30.0 | — | 15.0 | — | — |
| COMP-112 | 23.4 | SR351 | 15.0 | — | — | 30.0 | 15.0 | — | — | — |
| COMP-113 | 23.4 | G1122 | 15.0 | — | — | 30.0 | 15.0 | — | — | — |
| COMP-114 | 23.4 | — | — | — | — | 30.0 | 30.0 | — | — | — |
| COMP-115 | 23.4 | — | — | — | — | 30.0 | — | 30.0 | — | — |
| COMP-116 | 23.4 | SR454 | 15.0 | — | — | 45.0 | — | — | — | — |
| COMP-117 | 23.4 | G1122 | 15.0 | — | — | 45.0 | — | — | — | — |
| COMP-118 | 23.4 | — | — | — | — | 45.0 | 15.0 | — | — | — |
| COMP-119 | 23.4 | — | — | — | — | 45.0 | — | 15.0 | — | — |
| COMP-120 | 23.4 | — | — | — | — | 60.0 | — | — | — | — |
| INV-1 | 38.4 | — | — | — | — | 15.0 | 15.0 | — | CN435 | 15.0 |
| INV-2 | 38.4 | — | — | — | — | 15.0 | — | 15.0 | CN435 | 15.0 |
| INV-3 | 38.4 | — | — | — | — | 15.0 | 15.0 | — | SR499 | 15.0 |
| INV-4 | 38.4 | — | — | — | — | 15.0 | 15.0 | — | SR502 | 15.0 |

TABLE 10-continued

| Inkjet Ink | DPGDA | Non-cyclic monomer | Cyclic Monomer with Tg < 20° C. | TBCH | VCL | VEEA | EO/PO Polyacrylate | |
|---|---|---|---|---|---|---|---|---|
| INV-5 | 38.4 | — | — | — | 15.0 | 15.0 | — | CN435 | 15.0 |
| INV-6 | 38.4 | — | — | — | 15.0 | 15.0 | — | SR415 | 15.0 |
| INV-7 | 38.4 | — | — | — | 15.0 | 15.0 | — | SR344 | 15.0 |
| INV-8 | 38.4 | — | — | — | 15.0 | 15.0 | — | SR610 | 15.0 |
| INV-9 | 38.4 | — | — | — | 15.0 | 15.0 | — | SR9021 | 15.0 |
| INV-10 | 23.4 | — | — | — | 15.0 | 15.0 | — | CN435 | 30.0 |
| INV-11 | 23.4 | — | — | — | 15.0 | — | 15.0 | CN435 | 30.0 |
| INV-12 | 23.4 | — | — | — | 15.0 | 15.0 | — | SR499 | 30.0 |
| INV-13 | 23.4 | — | — | — | 15.0 | 15.0 | — | SR502 | 30.0 |
| INV-14 | 23.4 | — | — | — | 15.0 | 15.0 | — | CN435 | 30.0 |
| INV-15 | 23.4 | — | — | — | 15.0 | 15.0 | — | SR415 | 30.0 |
| INV-16 | 23.4 | — | — | — | 15.0 | 15.0 | — | SR344 | 30.0 |
| INV-17 | 23.4 | — | — | — | 15.0 | 15.0 | — | SR610 | 30.0 |
| INV-18 | 23.4 | — | — | — | 15.0 | 15.0 | — | SR9021 | 30.0 |
| INV-19 | 23.4 | — | — | — | 15.0 | 30.0 | — | CN435 | 15.0 |
| INV-20 | 23.4 | — | — | — | 15.0 | — | 30.0 | CN435 | 15.0 |
| INV-21 | 23.4 | — | — | — | 15.0 | 30.0 | — | SR499 | 15.0 |
| INV-22 | 23.4 | — | — | — | 15.0 | 30.0 | — | SR502 | 15.0 |
| INV-23 | 23.4 | — | — | — | 15.0 | 30.0 | — | CN435 | 15.0 |
| INV-24 | 23.4 | — | — | — | 15.0 | 30.0 | — | SR415 | 15.0 |
| INV-25 | 23.4 | — | — | — | 15.0 | 30.0 | — | SR344 | 15.0 |
| INV-26 | 23.4 | — | — | — | 15.0 | 30.0 | — | SR610 | 15.0 |
| INV-27 | 23.4 | — | — | — | 15.0 | 30.0 | — | SR9021 | 15.0 |
| INV-28 | 23.4 | — | — | — | 30.0 | 15.0 | — | SR499 | 15.0 |
| INV-29 | 23.4 | — | — | — | 30.0 | 15.0 | — | SR502 | 15.0 |
| INV-30 | 23.4 | — | — | — | 30.0 | 15.0 | — | CN435 | 15.0 |
| INV-31 | 23.4 | — | — | — | 30.0 | 15.0 | — | SR415 | 15.0 |
| INV-32 | 23.4 | — | — | — | 30.0 | 15.0 | — | SR344 | 15.0 |
| INV-33 | 23.4 | — | — | — | 30.0 | 15.0 | — | SR610 | 15.0 |
| INV-34 | 23.4 | — | — | — | 30.0 | 15.0 | — | SR9021 | 15.0 |
| INV-35 | 16.3 | G1122 | 6.0 | — | 15.0 | — | 21.0 | CN435 | 25.0 |

Evaluation and Results

All the inkjet inks were evaluated for flexibility, scratch resistance, curing speed and viscosity. The adhesion was tested for the following substrates: PP1, PP2, PVC1, PVC2 and PS. The results are given by Table 11.

TABLE 11

| Inkjet Ink | TBCH | VCL and VEEA | EO/PO Polyacrylate | Flexibility | Average adhesion | Scratch resistance | Curing speed | Viscosity (mPa·s) |
|---|---|---|---|---|---|---|---|---|
| COMP-1 | — | — | — | C | D | B | B | 17 |
| COMP-2 | — | — | — | A | C | C | B | 14 |
| COMP-3 | — | — | — | C | A | B | A | 11 |
| COMP-4 | — | — | — | D | B | A | A | 14 |
| COMP-5 | — | — | — | B | A | C | A | 7 |
| COMP-6 | — | — | — | D | A | A | A | 9 |
| COMP-7 | — | — | — | A | A | B | D | 4 |
| COMP-8 | — | — | — | B | D | C | A | 9 |
| COMP-9 | — | — | — | C | C | B | A | 8 |
| COMP-10 | — | — | — | A | D | C | A | 11 |
| COMP-11 | — | — | — | C | B | B | A | 17 |
| COMP-12 | — | — | — | A | C | C | A | 12 |
| COMP-13 | — | — | — | B | C | B | A | 9 |
| COMP-14 | — | — | — | C | C | A | A | 13 |
| COMP-15 | — | — | — | A | C | C | B | 10 |
| COMP-16 | — | — | — | A | C | B | A | 10 |
| COMP-17 | — | — | — | A | B | C | B | 7 |
| COMP-18 | — | — | 15.0 | B | C | B | A | 13 |
| COMP-19 | — | — | 15.0 | A | C | C | A | 13 |
| COMP-20 | — | — | 30.0 | A | C | A | A | 19 |
| COMP-21 | — | — | 30.0 | A | C | B | D | 20 |
| COMP-22 | — | — | 45.0 | A | A | B | D | 25 |
| COMP-23 | — | — | 45.0 | A | B | B | D | 32 |
| COMP-24 | — | 15.0 | — | C | A | B | B | 8 |
| COMP-25 | — | 15.0 | — | B | C | B | B | 7 |
| COMP-26 | — | 15.0 | — | D | A | B | A | 12 |
| COMP-27 | — | 15.0 | — | A | B | C | A | 11 |
| COMP-28 | — | 15.0 | — | D | A | B | A | 10 |
| COMP-29 | — | 15.0 | — | C | C | B | A | 9 |
| COMP-30 | — | 15.0 | — | D | B | A | A | 15 |
| COMP-31 | — | 15.0 | — | A | C | B | A | 13 |
| COMP-32 | — | 15.0 | — | C | B | A | A | 14 |

TABLE 11-continued

| Inkjet Ink | TBCH | VCL and VEEA | EO/PO Polyacrylate | Flexibility | Average adhesion | Scratch resistance | Curing speed | Viscosity (mPa·s) |
|---|---|---|---|---|---|---|---|---|
| COMP-33 | — | 15.0 | — | A | C | B | A | 11 |
| COMP-34 | — | 15.0 | — | C | A | B | A | 8 |
| COMP-35 | — | 15.0 | — | C | A | B | A | 6 |
| COMP-36 | — | 15.0 | — | C | A | B | A | 7 |
| COMP-37 | — | 15.0 | — | C | A | B | A | 10 |
| COMP-38 | — | 15.0 | — | A | A | C | A | 9 |
| COMP-39 | — | 15.0 | — | C | A | B | A | 9 |
| COMP-40 | — | 15.0 | — | A | A | C | A | 8 |
| COMP-41 | — | 15.0 | — | A | A | C | A | 6 |
| COMP-42 | — | 15.0 | — | C | A | B | A | 6 |
| COMP-43 | — | 15.0 | — | A | A | C | A | 6 |
| COMP-44 | — | 15.0 | — | A | B | C | A | 8 |
| COMP-45 | — | 15.0 | — | A | C | C | A | 11 |
| COMP-46 | — | 15.0 | — | A | B | C | A | 9 |
| COMP-47 | — | 15.0 | — | C | A | B | A | 8 |
| COMP-48 | — | 15.0 | — | A | A | C | A | 9 |
| COMP-49 | — | 15.0 | — | D | B | B | A | 9 |
| COMP-50 | — | 15.0 | — | B | B | C | A | 8 |
| COMP-51 | — | 15.0 | 15.0 | B | C | B | B | 10 |
| COMP-52 | — | 15.0 | 45.0 | A | B | A | D | 28 |
| COMP-53 | — | 15.0 | 45.0 | A | D | A | D | 24 |
| COMP-54 | — | 30.0 | — | C | A | B | B | 9 |
| COMP-55 | — | 30.0 | — | A | C | B | B | 8 |
| COMP-56 | — | 30.0 | — | D | A | A | A | 7 |
| COMP-57 | — | 30.0 | — | C | A | B | A | 6 |
| COMP-58 | — | 30.0 | — | D | A | A | A | 11 |
| COMP-59 | — | 30.0 | — | A | B | C | A | 10 |
| COMP-60 | — | 30.0 | — | D | A | A | A | 9 |
| COMP-61 | — | 30.0 | — | B | C | B | A | 8 |
| COMP-62 | — | 30.0 | — | C | A | C | A | 5 |
| COMP-63 | — | 30.0 | — | D | A | B | A | 6 |
| COMP-64 | — | 30.0 | — | C | A | B | A | 7 |
| COMP-65 | — | 30.0 | — | D | A | B | A | 9 |
| COMP-66 | — | 30.0 | — | A | A | C | A | 8 |
| COMP-67 | — | 30.0 | — | D | A | A | A | 6 |
| COMP-68 | — | 30.0 | — | D | A | B | A | 7 |
| COMP-69 | — | 30.0 | 15.0 | C | A | B | A | 10 |
| COMP-70 | — | 30.0 | 15.0 | D | A | B | A | 8 |
| COMP-71 | — | 45.0 | — | B | A | B | D | 9 |
| COMP-72 | — | 45.0 | — | A | B | B | D | 8 |
| COMP-73 | — | 45.0 | — | D | A | B | D | 6 |
| COMP-74 | — | 45.0 | — | A | A | A | D | 6 |
| COMP-75 | — | 60.0 | — | A | A | D | D | 5 |
| COMP-76 | — | 60.0 | — | C | A | B | B | 4 |
| COMP-77 | 15.0 | — | — | C | C | B | B | 9 |
| COMP-78 | 15.0 | — | — | B | C | B | B | 9 |
| COMP-79 | 15.0 | — | — | B | C | C | A | 12 |
| COMP-80 | 15.0 | — | — | B | B | C | A | 10 |
| COMP-81 | 15.0 | — | — | C | C | B | A | 16 |
| COMP-82 | 15.0 | — | — | A | D | B | A | 12 |
| COMP-83 | 15.0 | — | 15.0 | A | D | B | B | 12 |
| COMP-84 | 15.0 | — | 45.0 | A | B | B | D | 31 |
| COMP-85 | 15.0 | 15.0 | — | A | B | C | B | 8 |
| COMP-86 | 15.0 | 15.0 | — | C | A | C | B | 6 |
| COMP-87 | 15.0 | 15.0 | — | C | C | B | B | 7 |
| COMP-88 | 15.0 | 15.0 | — | D | A | A | A | 11 |
| COMP-89 | 15.0 | 15.0 | — | D | A | A | A | 10 |
| COMP-90 | 15.0 | 15.0 | — | D | A | A | A | 9 |
| COMP-91 | 15.0 | 15.0 | — | D | A | A | A | 11 |
| COMP-92 | 15.0 | 15.0 | — | A | A | C | A | 10 |
| COMP-93 | 15.0 | 30.0 | — | B | A | C | A | 7 |
| COMP-94 | 15.0 | 30.0 | — | D | A | B | D | 5 |
| COMP-95 | 15.0 | 30.0 | — | D | A | B | A | 7 |
| COMP-96 | 15.0 | 30.0 | — | D | A | A | A | 8 |
| COMP-97 | 15.0 | 30.0 | — | A | A | C | A | 8 |
| COMP-98 | 15.0 | 45.0 | — | B | A | B | D | 7 |
| COMP-99 | 15.0 | 45.0 | — | B | A | B | D | 4 |
| COMP-100 | 30.0 | — | — | D | B | C | A | 9 |
| COMP-101 | 30.0 | — | — | D | B | C | A | 9 |
| COMP-102 | 30.0 | — | — | D | C | B | A | 12 |
| COMP-103 | 30.0 | — | — | A | B | C | A | 10 |
| COMP-104 | 30.0 | — | 15.0 | B | B | C | A | 11 |
| COMP-105 | 30.0 | — | 30.0 | A | C | B | A | 17 |
| COMP-106 | 30.0 | 15.0 | — | C | A | D | A | 7 |
| COMP-107 | 30.0 | 15.0 | — | C | A | C | A | 9 |
| COMP-108 | 30.0 | 15.0 | — | B | A | D | A | 8 |

TABLE 11-continued

| Inkjet Ink | TBCH | VCL and VEEA | EO/PO Polyacrylate | Flexibility | Average adhesion | Scratch resistance | Curing speed | Viscosity (mPa·s) |
|---|---|---|---|---|---|---|---|---|
| COMP-109 | 30.0 | 15.0 | — | B | A | C | A | 6 |
| COMP-110 | 30.0 | 15.0 | — | C | A | C | A | 8 |
| COMP-111 | 30.0 | 15.0 | — | A | A | C | D | 7 |
| COMP-112 | 30.0 | 15.0 | — | D | A | A | A | 8 |
| COMP-113 | 30.0 | 15.0 | — | A | A | C | A | 8 |
| COMP-114 | 30.0 | 30.0 | — | B | A | C | A | 7 |
| COMP-115 | 30.0 | 30.0 | — | C | A | B | B | 5 |
| COMP-116 | 45.0 | — | — | B | B | C | B | 8 |
| COMP-117 | 45.0 | — | — | A | B | C | B | 8 |
| COMP-118 | 45.0 | 15.0 | — | A | A | D | B | 7 |
| COMP-119 | 45.0 | 15.0 | — | B | A | D | B | 6 |
| COMP-120 | 60.0 | — | — | A | A | D | B | 7 |
| INV-1 | 15.0 | 15.0 | 15.0 | A | A | B | B | 11 |
| INV-2 | 15.0 | 15.0 | 15.0 | B | B | B | A | 9 |
| INV-3 | 15.0 | 15.0 | 15.0 | B | A | A | A | 10 |
| INV-4 | 15.0 | 15.0 | 15.0 | B | A | A | A | 10 |
| INV-5 | 15.0 | 15.0 | 15.0 | B | A | A | A | 11 |
| INV-6 | 15.0 | 15.0 | 15.0 | A | A | A | A | 12 |
| INV-7 | 15.0 | 15.0 | 15.0 | A | A | A | A | 9 |
| INV-8 | 15.0 | 15.0 | 15.0 | A | A | A | A | 10 |
| INV-9 | 15.0 | 15.0 | 15.0 | B | A | A | A | 9 |
| INV-10 | 15.0 | 15.0 | 30.0 | A | B | B | A | 17 |
| INV-11 | 15.0 | 15.0 | 30.0 | A | B | A | A | 15 |
| INV-12 | 15.0 | 15.0 | 30.0 | B | A | A | A | 13 |
| INV-13 | 15.0 | 15.0 | 30.0 | A | A | A | A | 14 |
| INV-14 | 15.0 | 15.0 | 30.0 | A | A | A | A | 16 |
| INV-15 | 15.0 | 15.0 | 30.0 | A | A | A | A | 18 |
| INV-16 | 15.0 | 15.0 | 30.0 | A | A | A | A | 12 |
| INV-17 | 15.0 | 15.0 | 30.0 | A | A | B | A | 14 |
| INV-18 | 15.0 | 15.0 | 30.0 | A | A | A | A | 12 |
| INV-19 | 15.0 | 30.0 | 15.0 | A | A | A | A | 11 |
| INV-20 | 15.0 | 30.0 | 15.0 | B | A | B | A | 8 |
| INV-21 | 15.0 | 30.0 | 15.0 | B | A | A | A | 9 |
| INV-22 | 15.0 | 30.0 | 15.0 | A | A | A | A | 9 |
| INV-23 | 15.0 | 30.0 | 15.0 | A | A | A | A | 10 |
| INV-24 | 15.0 | 30.0 | 15.0 | A | A | A | A | 11 |
| INV-25 | 15.0 | 30.0 | 15.0 | A | A | A | A | 9 |
| INV-26 | 15.0 | 30.0 | 15.0 | A | A | B | A | 10 |
| INV-27 | 15.0 | 30.0 | 15.0 | B | A | A | A | 8 |
| INV-28 | 30.0 | 15.0 | 15.0 | B | A | A | A | 9 |
| INV-29 | 30.0 | 15.0 | 15.0 | A | A | A | A | 10 |
| INV-30 | 30.0 | 15.0 | 15.0 | A | A | A | A | 10 |
| INV-31 | 30.0 | 15.0 | 15.0 | A | A | A | A | 11 |
| INV-32 | 30.0 | 15.0 | 15.0 | A | A | A | A | 9 |
| INV-33 | 30.0 | 15.0 | 15.0 | A | A | B | A | 10 |
| INV-34 | 30.0 | 15.0 | 15.0 | A | A | B | A | 9 |
| INV-35 | 15.0 | 21.0 | 25.0 | A | A | A | A | 13 |

From Table 11, it should be clear that only the inkjet inks according to preferred embodiments of the present invention and using the specific monomers in the specific weight percentage ranges exhibit good flexibility and scratch resistance, while maintaining low viscosity for jetting performance, high curing speed and good adhesion to a wide range of substrates.

Example 2

This example illustrates how the $T_g$ of the one or more cyclic monofunctional acrylates in the inkjet ink in accordance with the invention influences the flexibility and scratch resistance.

Preparation of Inkjet Inks

The comparative inkjet inks COMP-121 to COMP-132 and the inventive inkjet inks INV-36 to INV-38 were all prepared in the same manner by combining the same concentrated pigment dispersion CPD1 of EXAMPLE 1 with the components according to Table 12. The polymerizable compounds used in each inkjet ink are given by Table 13.

TABLE 12

| Component | wt % of the components |
|---|---|
| PB15:4 | 2.0 |
| DB162 | 2.0 |
| EPD | 2.5 |
| ITX | 2.0 |
| IRGACURE ™ 907 | 5.0 |
| BYK ™ UV 3510 | 0.3 |
| INHIB | 1.0 |
| Polymerizable compounds | 85.2 (according to Table 13) |

TABLE 13

| Inkjet ink | TBCH | PEA | THFA | cTMPFA | IBOA | VCL | CN435 |
|---|---|---|---|---|---|---|---|
| COMP-121 | 0.0 | 0.0 | 53.0 | 0.0 | 0.0 | 0.0 | 23.8 |
| COMP-122 | 0.0 | 61.8 | 0.0 | 0.0 | 0.0 | 0.0 | 15.0 |
| COMP-123 | 0.0 | 26.0 | 26.0 | 0.0 | 0.0 | 0.0 | 24.8 |
| COMP-124 | 0.0 | 0.0 | 27.0 | 27.0 | 0.0 | 0.0 | 22.8 |
| COMP-125 | 0.0 | 0.0 | 21.0 | 30.8 | 0.0 | 0.0 | 25.0 |

TABLE 13-continued

| Inkjet ink | TBCH | PEA | THFA | cTMPFA | IBOA | VCL | CN435 |
|---|---|---|---|---|---|---|---|
| COMP-126 | 0.0 | 0.0 | 23.0 | 0.0 | 0.0 | 23.0 | 30.8 |
| COMP-127 | 0.0 | 0.0 | 24.5 | 0.0 | 24.5 | 0.0 | 27.8 |
| COMP-128 | 24.0 | 0.0 | 24.0 | 0.0 | 0.0 | 0.0 | 28.8 |
| COMP-129 | 0.0 | 30.0 | 0.0 | 30.0 | 0.0 | 0.0 | 16.8 |
| COMP-130 | 0.0 | 28.0 | 0.0 | 0.0 | 0.0 | 28.0 | 20.8 |
| COMP-131 | 0.0 | 24.0 | 0.0 | 0.0 | 0.0 | 31.0 | 21.8 |
| COMP-132 | 28.0 | 28.0 | 0.0 | 0.0 | 0.0 | 0.0 | 20.8 |
| INV-36 | 17.7 | 19.0 | 0.0 | 0.0 | 0.0 | 18.6 | 21.5 |
| INV-37 | 0.0 | 24.8 | 0.0 | 0.0 | 15.0 | 22.0 | 15.0 |
| INV-38 | 15.0 | 24.8 | 0.0 | 0.0 | 0.0 | 22.0 | 15.0 |

Evaluation and Results

All the inkjet inks were evaluated for flexibility, scratch resistance, curing speed and viscosity. The adhesion was tested for the following substrates: PP1, PP2, PP2, PVC2, PVC3, PMMA and PS. The scratch resistance was determined for all inkjet inks using Scratch Test 2. The results are given by Table 14.

TABLE 14

| Inkjet Ink | Flexibility | Average adhesion | Scratch resistance | Curing Speed | Viscosity (mPa·s) |
|---|---|---|---|---|---|
| COMP-121 | A | A | D | B | 8 |
| COMP-122 | A | A | D | A | 10 |
| COMP-123 | A | A | D | B | 11 |
| COMP-124 | A | A | D | A | 11 |
| COMP-125 | A | A | D | A | 12 |
| COMP-126 | A | A | C | A | 11 |
| COMP-127 | A | A | C | A | 11 |
| COMP-128 | A | A | C | A | 11 |
| COMP-129 | A | B | C | A | 12 |
| COMP-130 | A | A | C | A | 11 |
| COMP-131 | A | A | C | A | 11 |
| COMP-132 | A | B | C | A | 11 |
| INV-36 | A | A | B | A | 11 |
| INV-37 | A | A | B | A | 9 |
| INV-38 | A | A | B | A | 9 |

From Table 14, it should be clear that only cyclic monofunctional acrylates wherein the homopolymer thereof has a $T_g$ larger than 20° C. are capable of providing inkjet inks according to a preferred embodiment of the present invention exhibiting good flexibility and scratch resistance, while maintaining low viscosity for jetting performance, high curing speed and good adhesion to a wide range of substrates.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A free radical radiation curable inkjet ink comprising:
   a photoinitiator; and
   polymerizable compounds including at least 45 wt % of a mixture of monomers consisting of:
   a) 10 to 35 wt % of one or more cyclic monofunctional acrylates wherein a homopolymer thereof has a $T_g$ larger than 20° C.;
   b) 10 to 30 wt % of a N-vinyl lactam and/or a vinylether acrylate; and
   c) 10 to 30 wt % of an ethoxylated and/or propoxylated polyacrylate having a molecular weight of at least 450; wherein
   all wt % are based on a total weight of the free radical radiation curable inkjet ink; and
   the $T_g$ is determined by the DSC method in ISO 11357-2: 1999.

2. The free radical radiation curable inkjet ink according to claim 1, wherein the vinylether acrylate is 2-(vinyloxyethoxy)ethyl acrylate.

3. The free radical radiation curable inkjet ink according to claim 1, wherein the N-vinyl lactam is N-vinyl caprolactam.

4. The free radical radiation curable inkjet ink according to claim 2, wherein the N-vinyl lactam is N-vinyl caprolactam.

5. The free radical radiation curable inkjet ink according to claim 1, wherein the one or more cyclic monofunctional acrylates are present in the free radical radiation curable inkjet ink in an amount between 15 wt % and 30 wt %.

6. The free radical radiation curable inkjet ink according to claim 1, wherein the N-vinyl lactam and/or vinylether acrylate is present in the free radical radiation curable inkjet ink in an amount between 15 wt % and 25 wt %.

7. The free radical radiation curable inkjet ink according to claim 5, wherein the N-vinyl lactam and/or vinylether acrylate is present in the free radical radiation curable inkjet ink in an amount between 15 wt % and 25 wt %.

8. The free radical radiation curable inkjet ink according to claim 1, wherein the ethoxylated and/or propoxylated multifunctional acrylate is present in the free radical radiation curable inkjet ink in an amount between 15 wt % and 25 wt %.

9. The free radical radiation curable inkjet ink according to claim 7, wherein the ethoxylated and/or propoxylated multifunctional acrylate is present in the free radical radiation curable inkjet ink in an amount between 15 wt % and 25 wt %.

10. The free radical radiation curable inkjet ink according to claim 1, wherein an amount of all polymerizable compounds is higher than 80 wt % based on the total weight of the free radical radiation curable inkjet ink.

11. The free radical radiation curable inkjet ink according to claim 1, wherein the free radical radiation curable inkjet ink has a viscosity of less than 20 mPa·s at 45° C. and at a shear rate of 1,000 s$^{-1}$.

12. The free radical radiation curable inkjet ink according to claim 1, wherein the one or more cyclic monofunctional acrylates are selected from the group consisting of 4-tert.butylcyclohexylacrylate and isobornyl acrylate.

13. The free radical radiation curable inkjet ink according to claim 1, further comprising a urethane acrylate.

14. The free radical radiation curable inkjet ink according to claim 1, wherein the free radical radiation curable inkjet ink includes no organic solvent or water.

15. The free radical radiation curable inkjet ink according to claim 1, wherein the free radical radiation curable inkjet ink is a colorless liquid.

16. A free radical radiation curable inkjet ink set comprising:
   at least two different free radical radiation curable inkjet inks as defined by claim 1.

17. An inkjet printing method comprising the steps of:
   providing a substantially non-absorbing ink-receiver;
   providing a free radical radiation curable inkjet ink as defined by claim 1; and
   inkjet printing the free radical radiation curable inkjet ink on the substantially non-absorbing ink-receiver.

* * * * *